(12) United States Patent
Yap et al.

(10) Patent No.: US 7,657,132 B1
(45) Date of Patent: Feb. 2, 2010

(54) OPTOELECTRONIC MODULATOR AND ELECTRIC-FIELD SENSOR WITH MULTIPLE OPTICAL-WAVEGUIDE GRATINGS

(75) Inventors: Daniel Yap, Newbury Park, CA (US); David L. Persechini, Calabasas, CA (US); Kevin Geary, Los Angeles, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 12/141,825

(22) Filed: Jun. 18, 2008

(51) Int. Cl.
G02F 1/295 (2006.01)

(52) U.S. Cl. .............. 385/10; 385/1; 385/4; 385/8; 385/12; 385/37

(58) Field of Classification Search .............. 385/1, 385/4, 8, 10, 37, 12
See application file for complete search history.

(56) References Cited

U.S. PATENT DOCUMENTS

| | | | |
|---|---|---|---|
| 5,076,622 A | 12/1991 | Detweiler | |
| 5,076,655 A | 12/1991 | Bridges | |
| 5,291,565 A | 3/1994 | Schaffner et al. | |
| 6,703,596 B1 | 3/2004 | Moran | |
| 6,724,523 B2 | 4/2004 | Yap | |
| 7,260,280 B2 | 8/2007 | Ichioka et al. | |

OTHER PUBLICATIONS

Bridges and Schaffner, IEEE Transactions on Microwave Theory and Techniques, vol. 43, No. 9, pp. 2184-2197 (Sep. 1995).

Betts, G.E., et al.,"High-Sensitivity Bandpass RF Modulator in LiNb03,"SPIE Integrated Optical Circuit Engineering VI, vol. 993, pp. 110-116 (1988).

Cho, et al., IEEE Journal of Quantum Electronics, vol. QE-13, No. 4, pp. 206-208 (Apr. 1977).

Cohn, S.B., et al.,"Optimum Design of Stepped Transmission-line Transformers," IRE Trans. Microwave Theory Tech., vol. 3, No. 3, pp. 16-20 (Apr. 1955).

Cutolo, et al., Applied Physics Letters, vol. 71, No. 2, pp. 199-201 (Jul. 14, 1997).

Emerson and Cumming Microwave Products, Eccostock HiK500F data sheet, www.eccosorb.com, rev. May 11, 2007.

Farwell, et al., IEEE Photonics Technology Letters, vol. 5, No. 7, pp. 779-782 (Jul. 1993).

Ghatak, A.K., et al., "Optical Electronics," pp. 441-447, Cambridge University Press, 1989.

Hsu, R.C., et al., "All-dielectric photonic-assisted radio front-end technology," Nature Photonics, vol., pp. 535-538 (Sep. 2007).

(Continued)

*Primary Examiner*—Jennifer Doan
(74) *Attorney, Agent, or Firm*—Ladas & Parry

(57) ABSTRACT

An optoelectronic-RF device has at least one optical modulator/sensor comprising at least two cascaded optical-waveguide gratings and at least one non-grating optical waveguide segment interconnecting the at least two cascaded optical-waveguide gratings, with at least one optical waveguide segment interconnecting the at least two cascaded optical-waveguide gratings via the at least one non-grating optical waveguide segment. An RF waveguide is provided for propagating an RF electric field, the at least one optical modulator/sensor being disposed in and forming a portion of the RF waveguide with light propagating through the cascaded optical-waveguide gratings in a direction that is perpendicular to a direction of propagation of the RF electric field in the RF waveguide.

19 Claims, 9 Drawing Sheets

OTHER PUBLICATIONS

Johnson, et al., IEEE Photonics Techn. Letters, vol. 2, No. 11, pp. 810-811 (Nov. 1990).
Khurgin, et al., Optical Letters, vol. 25, pp. 70-72 (2000).
Kim, et al., Electronics Letters, vol. 41, No. 18 (Sep. 1, 2005).
Lee, R.T., et al., "A design study for the basic TEM horn antenna," IEEE Antennas and Propagation Magazine, vol. 46, No. 1, pp. 86-92 (Feb. 2004).
1b.LINX Technologies RXM-900-HP-II RF Module specification-www.linxtechnologies.com.
1c. MAXIM, Receiver Sensitivity Equation for Spread Spectrum Systems, MAXIM application note 1140, Jun. 28, 2002 www.maxim-ic.com/an1140.
Morito, K., et al., "A Broad-Band MQW Semiconductor Optical Amplifier with High Saturation Output power and Low Noise Figure," IEEE Photon. Technol. Lett. vol. 17, No. 5, pp. 974-976 (May 2005).
NAVSYNC CW20 GPS receiver specification—www.navsync.com.
Ruze. J., "Wide-Angle Metal Plate Optics," Proceedings of the I.R.E., vol. 38, No. 1, pp. 53-59 (Jan. 1950).
Shaw, et al., Electronics Letters, vol. 35, No. 18, pp. 1557-1558 (Sep. 2, 1999).
Shi, W., et al., "Demonstration of Dual-Depletion-Region Electroabsorption modulator at 155 Wavelength for High Speed and Low Driving Voltage Performance," IEEE Photon. Technol. Lett., vol., 17, No. 10, pp. 2068-2070 (Oct. 2005).
Sun, et al., Electronic Letters, vol. 31, No. 11, pp. 902-903 (May 1995).
Taylor, Journal of Lightwave Technology, vol. 17, No. 10, pp. 1875-1883 (Oct. 1999).
Welstand, et al., IEEE Photonics Technology Letters, vol. 7, No. 7, pp. 751-753 (Jul. 1995).
Wood, L., "Opening Statement before the United States Senate committee on the Judiciary, Subcommittee on Terrorism," Mar. 8, 2005.

US 7,657,132 B1

OPTOELECTRONIC MODULATOR AND ELECTRIC-FIELD SENSOR WITH MULTIPLE OPTICAL-WAVEGUIDE GRATINGS

CROSS REFERENCE TO RELATED APPLICATIONS

This application is related to U.S. patent application Ser. No. 12/141,834, filed on the same date as this application and entitled "Enhanced Linearity RF Photonic Link" the disclosure of which is hereby incorporated herein by reference. This application is also related to the following U.S. patent application Ser. No. 12/176,089, filed on Jul. 18, 2008 and entitled "Parallel Modulator Photonic Link"; U.S. Ser. No. 12/176,071, filed on Jul. 18, 2008 and entitled "Microwave receiver front-end assembly and array"; and U.S. Ser. No. 12/176,114, filed on Jul. 18, 2008 and entitled "An RF Receiver Front-End Assembly".

TECHNICAL FIELD

This invention relates an optoelectronic device which can be used as either a modulator of light or an electric field sensor. It preferably contains multiple optical-waveguide gratings with segments of optical waveguide between those gratings. The gratings are preferably connected optically in a cascade manner, with light passing first through one grating and then through another grating. Each grating acts as a distributed Bragg reflector that reflects the light of specific optical wavelengths or frequencies.

BACKGROUND OF THE INVENTION AND THE PRESENT TECHNOLOGY

An electro-optic waveguide grating can modulate the intensity of the light transmitted through it, or reflected by it, based on an applied electric field. So an electro-optic waveguide grating can function either as an optical modulator whose modulating is affected by the electric field or as an electric field detector. If an electrical signal is purposefully generated for transmission purposes, then an electro-optic waveguide grating can be used to modulate the generated electrical signal onto an optical carrier signal. On the other hand, if an electric field needs to be sensed, then an electro-optic waveguide grating can be used to sense the electric field by modulating its temporal variation onto an optical carrier signal. So an electro-optic waveguide grating can thought of as either (or both) a sensor and a modulator.

The strength of the modulation produced by an electro-optic waveguide grating, i.e. the modulation depth of the modulated optical signal, increases as the overall length of the grating is increased. However, with a sufficiently long grating, it is possible that the light will not fully pass through the grating before the time-varying modulation signal has changed from producing a positive modulation (increased intensity of the light) to a negative modulation (decreased intensity of the light). Thus, the length of the grating sets a limit on the maximum frequency of the applied electric field (and in many applications the applied electric field is a radio frequency or RF field) that controls the modulation and conversely, the maximum frequency of the applied modulation-controlling signal sets a limit on the maximum length for a grating.

Although this application sets the length of each grating to be below that maximum length for a given modulation frequency, this application achieves stronger modulation than would be obtained for a single grating by passing the light through multiple gratings, with additional modulation of that light produced at each successive grating. By properly spacing these successive gratings, a high modulation frequency can be supported. However, the bandwidth of that modulation signal is limited. For example, assume that the center modulation frequency (carrier frequency) of an RF electric field is 10 GHz and that the RF signal modulated onto that RF electric field has a maximum frequency of 1 GHz. The frequency content (or the bandwidth) of the modulation waveform then extends from 9 to 11 GHz (assuming amplitude modulation—frequency modulation would likely result in a wider bandwidth).

In the prior art, optical modulators based on a single grating formed in electro-optic material have been described in articles by An, Cho and Matsuo (IEEE Journal of Quantum Electronics, vol. QE-13, no. 4, April 1977, pp. 206-208), by Cutolo et al. (Applied Physics Letters, vol. 71, no. 2, 14 Jul. 1997, pp. 199-201) and by Kim et al. (Electronics Letters, vol. 41, no. 18, 1 Sep. 2005). FIG. 1 shows an illustration of such a prior art modulator. All of these modulators use non-travelling-wave RF electrodes to apply the modulation controlling electric field. Those RF electrodes are not part of any RF waveguide. Those "bulk" electrodes typically are connected to an RF signal source by means of an RF cable and wires and represent the termination point for the RF cable. In contrast to these prior art devices, the RF electrodes in some embodiments of the present invention are part of a transverse-electromagnetic (TEM) RF waveguide or part of a mircostrip-transmission line RF waveguide. The RF field propagates along the RF waveguide.

Optical modulators that comprise a cascade of multiple gratings separated by optical-waveguide sections are described in articles by Shaw et al. (Electronics Letters, vol. 35, no. 18, 2 Sep. 1999, pp. 1557-1558), by Taylor (Journal of Lightwave Technology, vol. 17, no. 10, October 1999, pp. 1875-1883) and by Khurgin et al. (Optics Letters, vol. 25, 2000, pp. 70-72). FIG. 2 shows an illustration of these prior modulators. In these modulators, the RF electrodes are a part of a traveling-wave RF waveguide. The traveling RF wave propagates in this RF waveguide in the same direction as does the light carried in the optical waveguide. The function of the multiple gratings is to serve as optical reflectors, with each pair of such grating reflectors and the optical waveguide segment between them acting as an optical etalon. The cascade of etalons slows down the group velocity of the light propagating through that cascade. A goal of these prior devices is to match the velocity of the traveling RF field with the velocity of the traveling optical field (the light being modulated). In contrast to these prior art devices, the RF field of the present disclosure travels in a direction that is substantially perpendicular to the direction of travel of the light being modulated. The issue of velocity matching, the goal of these prior devices, is obviated by the present disclosure.

The prior art modulators have involved either single gratings with bulk electrodes or, when they have involved multiple gratings with traveling-wave electrodes, the RF field in those modulators travels in the same direction as the optical field. In contrast, for the multiple-grating modulators of the present invention, the RF field travels, in an RF waveguide or transmission line, in a direction that is essentially perpendicular to the direction in which the optical field travels.

The constraint in the present application about the maximum length of a given grating involves known principles concerning time-varying modulation and could be considered as known in the prior art. However, the constraint in the present disclosure about the length of the waveguide segment between two gratings is a result of the unique use of orthogonal propagation directions for the RF and optical fields. Such a constraint would have no relevance to any of the aforementioned prior art modulators.

BRIEF DESCRIPTION OF THE INVENTION

A plurality of gratings are formed in electro-optic material whose optical refractive index is dependent on the electric-field to which the electro-optic material is exposed. The individual gratings are interconnected using optical waveguide segments which need not be formed from an electro-optic material. The plurality of gratings of this modulator are preferably located within an RF waveguide such as a dielectric filled transverse electromagnetic (TEM) waveguide having parallel-plate metal electrodes with a dielectric fill between them, a micro-strip RF transmission line having a wide metal electrode and a narrower metal electrode arranged as parallel plates that are on opposing sides of a piece of dielectric material, or a dielectric-only RF waveguide having no metal. At least a portion of the dielectric material of this RF waveguide comprises electro-optic material in which the gratings are formed. An electromagnetic (EM) field that propagates in the RF waveguide has a time-varying electric-field component that modulates the electro-optic (EO) material. At a given instant in time, the amount of modulation can be different at different points along the RF waveguide. Likewise, at a given point along the RF waveguide, the amount of modulation varies with time as the electric field component of the RF electromagnetic field propagating past the point varies. The modulator can act as an electric-field sensor because the amount of intensity modulation it produces on the light depends on the strength of the electric field affecting that modulation.

The lengths of the gratings and the lengths of the optical waveguide segments are selected to satisfy a relationship between the time delay of the light propagating through the series-connected gratings and waveguide segments with the time-period of the RF time-varying electric field that controls the modulation. The length of each grating is constrained to be sufficiently short to allow the light propagating in a given grating to completely traverse that given grating in a time shorter than one-half period of the time-varying RF field, and preferably much shorter. In some embodiments, the multiple gratings can be located in the same cross-sectional slice through the EO-material-filled RF waveguide. These multiple gratings thus experience the propagating EM field simultaneously, i.e., they experience the same point of the time-periodic electric-field waveform. For these embodiments, the length of the optical waveguide segment between two successive gratings is selected so that the first grating experiences the time-periodic RF electric field at one point of the periodic waveform and the second grating experiences that RF electric field at a point of the periodic waveform that is spaced from the first point by approximately a multiple of one period of a dominant frequency component of the RF waveform (which is typically its carrier frequency). In some embodiments, the optical waveguide is formed in a non-EO material that has a lower optical refractive index than the EO material. Thus, the optical-waveguide segments can be longer, allowing them to accommodate features such as bends having low optical attenuation. In other embodiments, the RF waveguide is a micro-strip transmission line and its narrower metal electrode extends only as far as the gratings but does not cover the optical-waveguide segments.

In other embodiments, the different ones of the multiple gratings can be located at different cross-sectional slices through the EO-material-containing RF waveguide. The length of the optical waveguide segment between these gratings is selected so that the grating in one slice experiences the time-periodic electric field at one point of the periodic waveform and the grating in a next slice containing gratings preferably experiences the electric field at a point of the periodic waveform that is spaced from the first point by approximately a multiple of one period of the waveform. In this way, the time delay of the light arriving at successive gratings of the modulator is matched to the time period of the modulating waveform.

BRIEF DESCRIPTION OF THE DRAWINGS

FIG. 3b depicts an exemplary spectral response of a grating such as that depicted by FIG. 3a;

FIG. 4a is a cross section view of FIG. 4b as indicated.

FIG. 7b depicts that the RF field and the optical field reaching successive slices are time synchronized in the embodiment of FIG. 7a;

DETAILED DESCRIPTION

Figure 1:
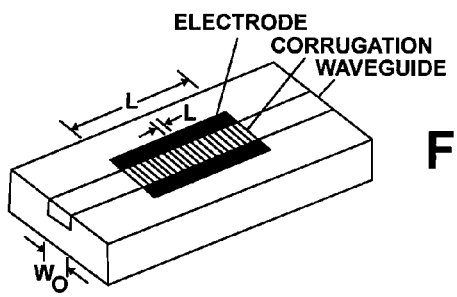
FIG. 1 is an illustration of a prior art single-grating optical modulator.
Figure 2:
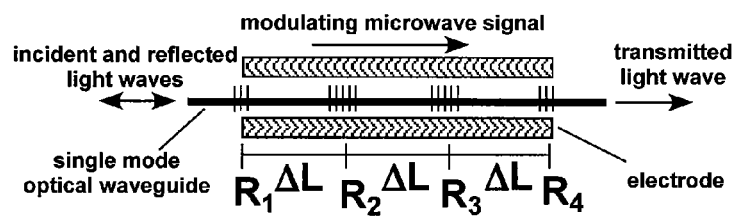
FIG. 2 is an illustration of a prior art multiple-grating optical modulator with co-directional traveling-wave electrode.
Figure 3A:
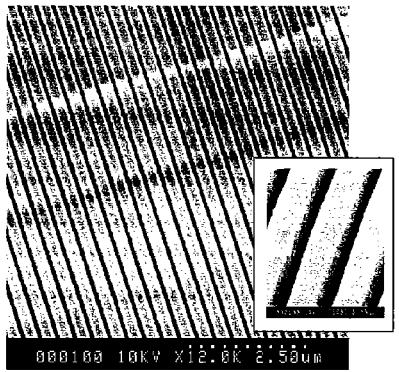
FIG. 3a is a photograph of a waveguide with an etched grating.
Figure 3B:
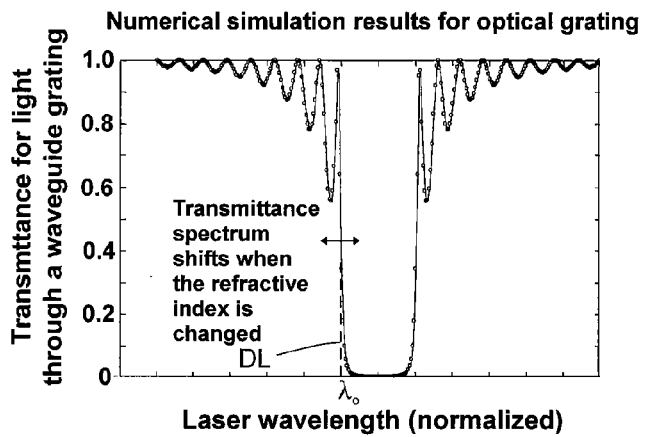

As is mentioned above, an optoelectronic device in accordance with the present invention can be used as either a modulator or an electric-field sensor. The modulator/sensor of the present invention includes multiple optical-waveguide gratings and segments of optical waveguide between those gratings. The goal of this invention is a device with increased sensitivity in the modulation of light with an analog RF signal. These gratings are preferably connected optically in a cascade manner, with light passing first through one grating and then through another grating. Each grating acts as a distributed Bragg reflector that reflects the light of specific optical wavelengths or frequencies. A grating formed in an optical waveguide has a periodic spatial variation in its optical refractive index. There are several known methods to form such a grating, with one method being to etch a periodic surface relief into a dielectric optical waveguide. FIG. 3a shows a photograph, taken with the assistance of a scanning electron microscope, of such a surface grating that has been etched into a titanium-diffused lithium niobate waveguide. A grating waveguide acts as a distributed Bragg reflector that can reflect certain wavelengths of the light propagating through the grating waveguide, transmit other wavelengths of the light and partially reflect yet other wavelengths of the light. An exemplary transmission spectrum of a grating is shown in FIG. 3b.

Figure 4A:
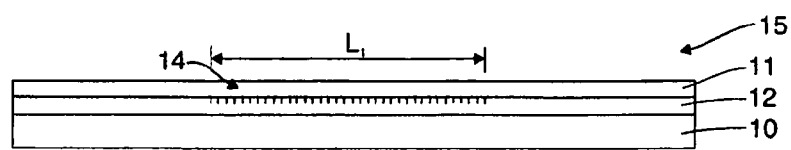
FIG. 4a depicts a waveguide grating formed in a body of electro-optic material with a waveguide formed therein.

For a waveguide-grating modulator/sensor according to the present invention, at least the grating(s) and, in some embodiments, also the rest of the optical waveguide is constructed in an electro-optic material. FIG. 4a depicts a waveguide grating 15 formed in a body of electro-optic material 10 with a waveguide 12 formed therein. The grating formed on an upper surface of the body of electro-optic material 10 is depicted by the series of short lines 14. The grating 15 may be covered, if desired, with an optional layer 11 of a dielectric material. The refractive index of electro-optic material 10 changes when that material is exposed to an electric field. The change in refractive index shifts the grating transmittance spectrum, as illustrated in FIG. 3b, toward longer or shorter wavelengths. The wavelength of the light to be modulated, $\lambda_o$, preferably coincides with an edge of the grating transmittance spectrum, as indicated in FIG. 3b by the intersections of dashed line DL with the curve for the transmittance and with the horizontal axis of the plot. Thus, a time-periodic electric field produces a time-periodic change in the transmittance for that wavelength of the light. The result is a time-periodic modulation of the intensity of the transmitted light as well as of the reflected light.

Figure 4B:
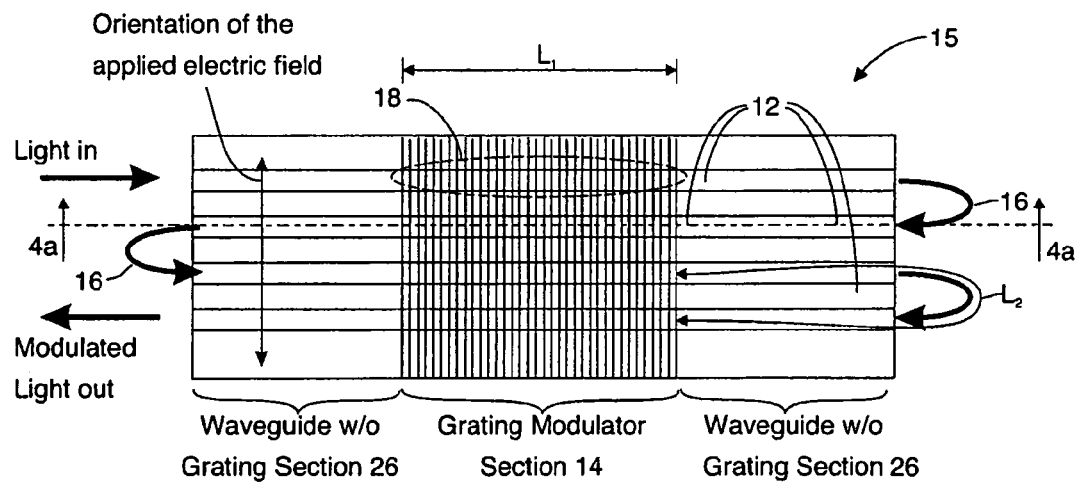
FIG. 4b is a top view of one embodiment of an optical modulator or electric field sensor comprising multiple gratings in accordance with the present disclosure.

The light propagating through a waveguide grating 15 can be thought of as experiencing an effective group delay. It takes a certain amount of time for that light to propagate from an input end of the grating to an output end of the waveguide grating 15. For an RF electric field that modulates the grating material index, it is preferable to keep the length $L_1$ of the grating 14 sufficiently short such that the light can propagate entirely from one end to the other in a time that is shorter than at most one-half of the period of that RF time-varying electric field. This constraint improves the efficiency with which the intensity of the light is modulated by the applied electric field. However, the depth of that intensity modulation also is greater if the light can interact with a longer grating. To be specific, a small percentage of that light is reflected at each spatial period of the grating 14. Thus, if the light encounters more periods of the grating, more light can be reflected and a greater change in the transmitted intensity is obtained for a given change in the material refractive index. One way to overcome this trade-off between achieving strong modulation depth and high modulation frequency (due to a short period of the RF waveform when high frequency electric fields are sensed or utilized) is to use a modulator that has multiple grating segments 18 interconnected by non-grating waveguide segments 26 as shown in FIG. 4b. In the embodiment of FIG. 4b, the grating modulator section 14 has four grating segments 18.

FIGS. 4a and 4b illustrate an exemplary embodiment of a multiple-grating optical modulator/sensor 15. The four optical waveguides are connected or formed to make a serpentine or zig-zag light path that overlaps with a grating pattern 18 that is etched into a region of the electro-optic material 10. In FIG. 4b the light path 16 at the ends of the electro-optic material 10 are shown as connecting with another waveguide in electro-optic material 10. This can be done by forming the waveguides 12 in a continuous serpentine or zig-zag pattern and/or by using mirrors (see elements 16' in FIG. 6a) or optical fibers (see elements 16 in FIG. 4b) at or near the ends of the electro-optic material 10 to cause the light to take the zig-zag light path shown in FIG. 4b. The length $L_2$ of the optical path between adjacent grating modulator sections 14 in a multiple-grating optical modulator/sensor 15 needs to be controlled, as will be explained below, so that the adjacent grating modulator sections 14 reinforce the modulation of the light as opposed to counteracting it.

As unmodulated light enters the first waveguide 12 (the uppermost waveguide 12 in embodiment of FIG. 4b), it encounters first a segment of non-grating waveguide 26, then, it encounters a section of waveguide with grating 18, followed by another segment of non-grating waveguide 26. The light then enters the next waveguide 12 where it continues in the same arrangement of a segment 26 of non-grating waveguide, followed by a section of waveguide with grating 18, which in turn is followed by another segment 26 of non-grating waveguide, and so on. The waveguide and grating can be similar to the one shown in FIG. 3a (i.e., a diffused waveguide in lithium niobate and an etched grating) or can be fabricated by some other known combination of methods for fabricating an optical waveguide 12 having a grating 14 therein (subject to selecting a material which allows one to deal successfully with the "catch-up" issue described later when a multiple slice embodiment is utilized). Preferably, no grating is formed in the non-grating waveguide sections 26. In fact, those waveguide sections 26 need not be made from an electro-optic material, such as lithium niobate, and the optically adjacent non-grating waveguide segments 26 can be formed as a single integral waveguide (i.e. with a turning section or mirror similar in function to section 16). What is needed is to have a sufficiently long optical path that contains a repeating pattern of grating 18 and non-grating 26 waveguides sections or segments. An internal serpentine or zig-zag shape is one possible way to achieve that long path or separate waveguides can be used as shown in FIG. 4b which are interconnected using fibers 16 to form a serpentine or zig-zag optical path.

A continuous serpentine or zig-zag shaped integral waveguide is shown for the embodiment of FIGS. 5a, 5b and 5c discussed in greater detail below. One way to form a zig-zag path is to have the waveguide make an abrupt turn at the preferably planar endfaces of the material, as illustrated in FIG. 5b. At least a portion of one or both endfaces can be coated with a reflective material (such as a metal, but preferably a multi-layer dielectric reflector 16') to increase the amount of light that remains in the waveguide after the turn. Ways to form a serpentine path also include forming a series of semi-circular waveguide bends (U-turns). In some embodiments, the non-grating waveguide is formed in a non-electro-optic material 23 such as silica whose optical refractive index is lower than the optical refractive index of the grating material 10, such as lithium niobate. Given its lower index, the waveguide segment in silica can be longer and yet produce the same propagation delay of the light. The longer waveguide segment is beneficial since the radius of curvature of the semi-circular bend can be greater, for lower optical attenuation.

Figure 5A:
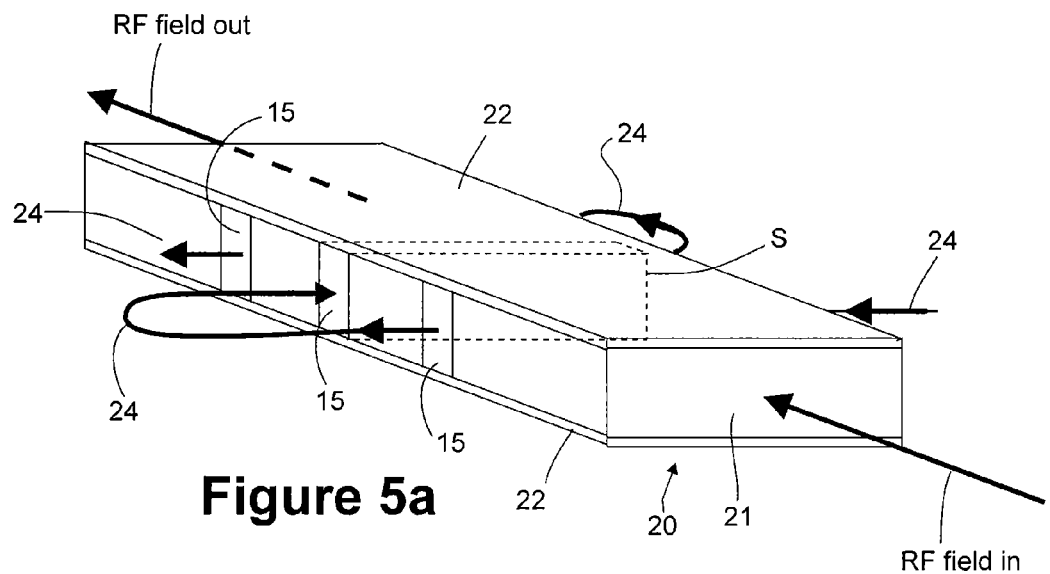
FIG. 5a illustrates an RF waveguide containing an optical modulator within at least one cross-sectional slice of the RF waveguide.
Figure 5B:
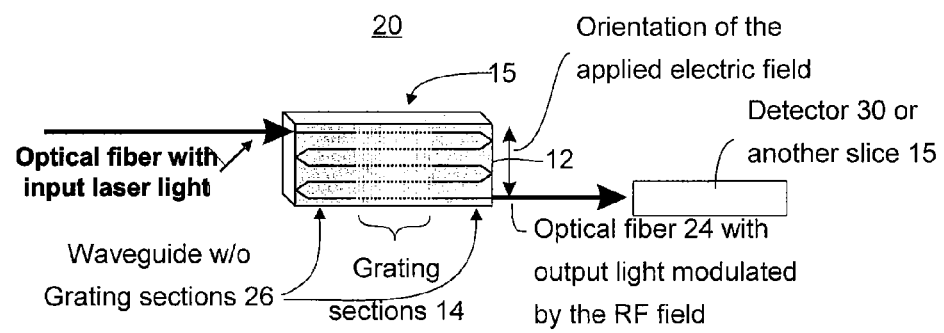
FIG. 5b depicts an embodiment of an optical modulator within a slice of FIG. 5a in greater detail.

A preferred way to obtain a modulating electric field is to embed one or more electro-optic grating waveguide structures 15 in an RF waveguide 20, as illustrated in FIG. 5a. The RF electromagnetic field that is launched or coupled into the RF waveguide 20 propagates through that waveguide 20. The modulating electric field is the electric field component of that propagating RF electromagnetic field at the cross-sectional slice (see the dashed lines labeled 'S' for an outline of one of the three slices depicted within waveguide 20) of the RF waveguide 20 containing the electro-optic grating waveguide structures 14. The RF electromagnetic field modulates the refractive index of the electro-optic grating modulator when it propagates past that modulator. Examples of suitable RF waveguides include dielectric waveguides and dielectric-filled metal-enclosed waveguides. One RF waveguide 20 which may be used is a transverse-electromagnetic (TEM) waveguide that has two metal electrodes 22 (parallel plates or films) that sandwich a slab 21 consisting of dielectric material. In FIG. 5a. such parallel plates or films extend beyond the slice 15, which is indicated by the dashed outline. The metal electrodes are not shown in the detailed view of FIG. 5b, but the electrodes 22 of a TEM waveguide 20 can be seen in FIGS. 6a and 6d. An advantage of the TEM waveguide 20 is that it establishes a substantially uniform electric field pattern in the vicinity of the grating structures 14.

Figure 5C:
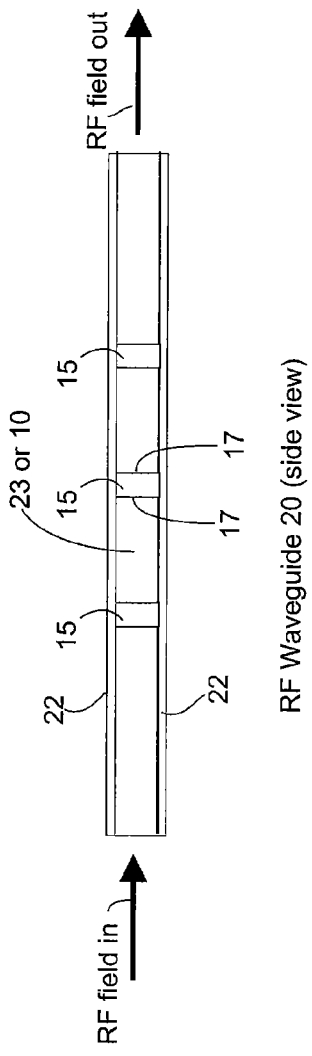
FIG. 5c illustrates an optical modulator located in a plurality of slices within an RF waveguide.
Figure 6A:
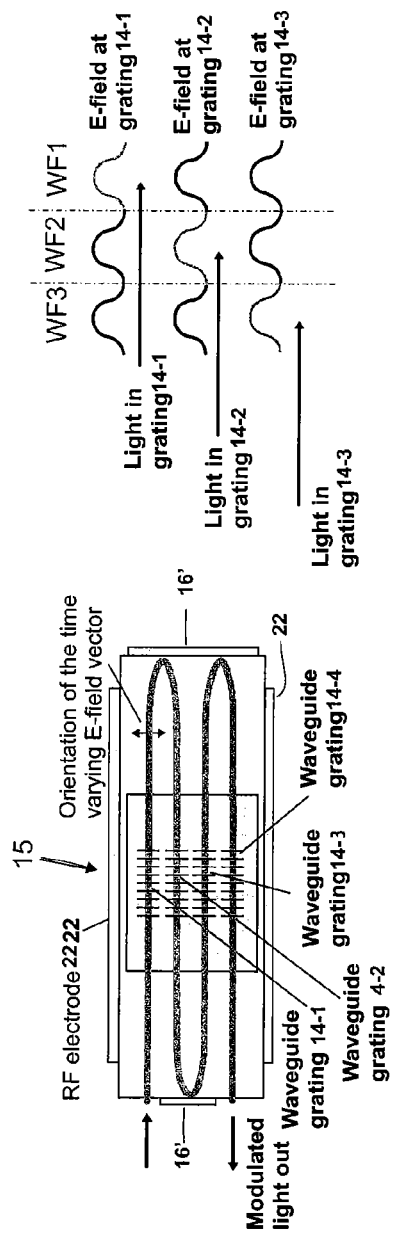
FIG. 6a is a cross-sectional, schematic view of a modulator slice in an RF waveguide having parallel-plate electrodes.
Figure 6B:
FIG. 6b is an illustration of time-delay matching used for the multiple gratings within a slice and demonstrates that the lengths of the waveguide sections without grating sections are selected so that the wavefront of the light in each grating waveguide occurs at a common point on a sine wave representation of the carrier frequency component of the applied electric field, but for a different (neighboring) sine wave period in a series of sine wave periods.
Figure 6C:
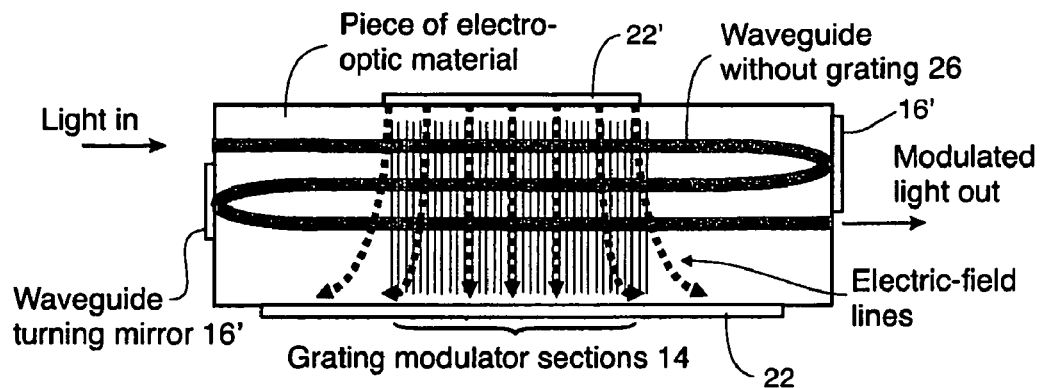
FIG. 6c is a cross-sectional, schematic view of a modulator slice in an RF waveguide with a micro-strip electrode.

Another preferred RF waveguide 20 is a micro-strip transmission line that comprises a narrower metal electrode 22' and a wider metal electrode 22 arranged as parallel plates or films sandwiching a slab 21 of dielectric material, which can be seen in FIG. 6c (FIG. 6c is a cross sectional view through the slab 21 in the vicinity of a slice 15). A slice of the RF waveguide 20 is shown in FIG. 5c. Although the entire dielectric slab 21 forming an RF waveguide 20 could be made of electro-optic material 10, it is sufficient to provide one or more slices 15 of the electro-optic material 10 which contain individual waveguide structures 12 each of which has one or more gratings 14 formed in, on or adjacent to the waveguide structures 12. Preferably, the non-electro-optic dielectric material 23 (if used) and the electro-optic material 10 of the RF waveguide have approximately the same dielectric constant, to avoid having unwanted reflections at the interfaces 17 between those materials. Each modulator/sensor slice 15 may include a multiple-grating optical modulator/sensor, such as illustrated in the embodiments of FIGS. 4b and/or 5b and/or 6a and/or 6c and/or 6d. There may be additional layers of a material that has a lower optical refractive index located between the electro-optic modulator material 10 (such as on the side of the slice that has the etched gratings) and the non-electro-optic material 21 of the RF waveguide 20. This lower-optical-index layer helps to define the spatially periodic refractive index variation of the grating.

FIG. 5b shows the structure of the multiple waveguide gratings, similar to that described previously with reference to FIGS. 4a and 4b, but in this view the waveguide grating sections 14 are formed in a single continuous waveguide 12.

Note from FIGS. 5a, 5b and 5c that the direction in which the RF electromagnetic field propagates through the RF waveguide 20 is perpendicular to the direction in which the light propagates through the optical gratings 14. Thus, all of the grating sections 14 in a slice 15 experience the RF electromagnetic field concurrently. However, since light takes some time to propagate through the successive grating sections 14 of the optical waveguide 12, that light reaches each successive grating section 14 at a slightly different time. The length $L_2$ of the non-grating waveguide segment(s) between two successive grating sections 14 (see FIG. 4b) is selected as follows. Length $L_2$ is chosen such that the time required for the light to propagate through a section of waveguide grating 14 and a segment of non-grating waveguide immediately following that grating section is equal to a multiple of one period of the time-varying RF electric field, assuming that the RF electric field has a constant frequency. In many cases the RF electric field will not have a constant frequency, so a center or carrier frequency of the RF electric field is selected. Thus, the light is timed to reach each successive grating within an individual modulator/sensor structure 15 at approximately the same point (in time) of the RF waveform period. But each successive grating sees a different, but preferably a neighboring portion of the waveform. This condition is illustrated in FIGS. 6a and 6b. FIG. 6a is similar to FIG. 5b, but the RF electrodes 22 that are depicted generate the RF electric field when an RF voltage is applied to them (the RF electrodes 22 are depicted as being immediately adjacent slice 15, but they are arranged so that a plurality of slices 15 are subjected, in temporal succession, to a common RF electric field as shown in FIG. 5c). FIG. 6b demonstrates that the lengths $L_2$ of the waveguide sections 26 without a grating are selected so that the wavefront of the light in each grating waveguide 14-1, 14-2, and 14-3 (for example) occurs at a common point on a sine wave representation of the carrier frequency component of the applied electric field, but for a different (neighboring) sine wave period in a series of sine wave periods WF1, WF2, WF3, . . . . Note that when this condition is met, all of the gratings 14-1, 14-2, . . . in the same multiple-grating modulator slice 15 will produce the same modulation of the optical intensity. For example, all of the grating sections will have increased transmittance during the half cycles of the applied electric RF electric field when a given portion of the light is propagating through those grating sections. However, during the other half cycles of the applied electric RF electric field, when those grating sections would have decreased transmittance, that given portion of the light is propagating through the non-grating waveguide segments and so its intensity is not affected. Thus, the overall modulation of the transmittance through the cascade of gratings in a single slice 15 is enhanced.

As indicated above, length $L_2$ is chosen such that the time required for the light to propagate through a section of waveguide grating 14 and a segment of non-grating waveguide 26 immediately following that grating section is preferably equal to one period of the time-varying RF electric field, assuming that the RF electric field has a constant frequency. If the RF electric field is constant (or nearly so), then this restriction could be stated as length $L_2$ being chosen such that the time required for the light to propagate through a section of waveguide grating 14 and a segment of non-grating waveguide immediately following that grating section is equal to an integer multiple of the period of the RF electric field. But as will be seen, the light exiting a slice plays "catch-up" before meeting a following slice, and thus from that perspective, the less delay that occurs per slice is helpful and there the length $L_2$ is selected such that the time required for the light to propagate through a section of waveguide grating 14 and a segment of non-grating waveguide immediately following that grating section is preferably equal to one period of the time-varying RF electric field. So the aforementioned integer multiple is preferably one.

So in FIG. 6b, the light in grating 14-1 "sees" a first waveform period WF1 of the RF electric field, while the light in grating 14-2 "sees" a following second (neighboring) waveform period WF2 of the RF electric field, while the light in grating 14-3 "sees" a following third waveform period WF3 of the RF electric field. Each of these gratings 14-1, 14-2, 14-3, . . . , is located in a common slice 15.

In the embodiment of FIG. 6a the light enters and exits each grating waveguide slice 15 on a common side thereof (note that this embodiment has an even number of gratings per slice) whereas in the embodiment of FIGS. 5a and 5b the light enters and exits each grating waveguide slice 15 on opposing sides thereof (note that this embodiment has an odd number of gratings per slice). Either scheme may be used (and the scheme selected would most likely depend on whether the slice has an even or odd number of grating sections therein), but in FIG. 5a the arrangement of the optical fibers 24 would need to be modified slightly when the grating waveguide 15 of FIG. 6a is used therein to accommodate the light entering and exiting each grating waveguide 15 on a common side thereof.

FIG. 6c is a cross sectional view similar to that of FIG. 6a, but shows an embodiment of a modulator slice 15 in the RF waveguide 20 having a micro-strip transmission line that includes an electrode 22' of smaller width (the micro-strip) and an electrode 22 of substantially larger width (the ground plane) that lie on opposing side of the slab 21 of dielectric material. Note the spreading of the electric field lines. As such the optical waveguides are arranged towards the top of the RF waveguide in this view.

Figure 6D:
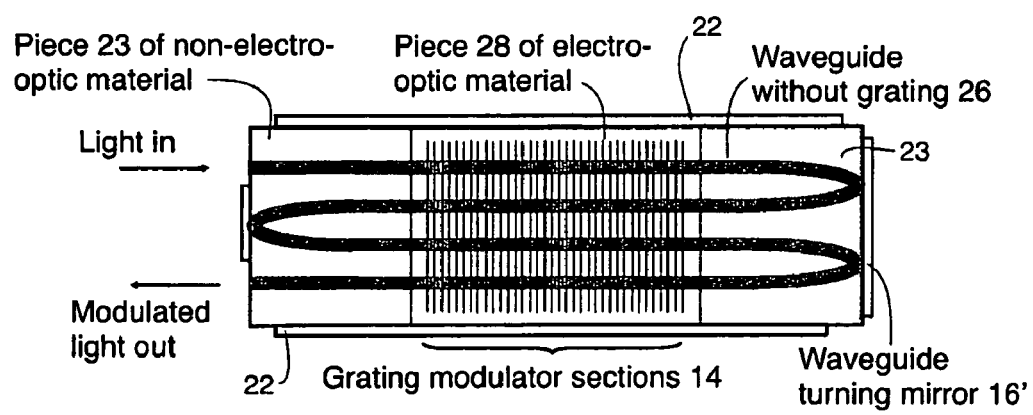
FIG. 6d is a cross-sectional, schematic view of a modulator slice in an RF waveguide having parallel-plate electrodes and non-electro-optic material for the non-grating sections.

FIG. 6d is a cross sectional view similar to that of FIG. 6a, but shows an embodiment of a modulator slice 15 in the RF waveguide 20 where the optical waveguide without grating sections 26 is constructed in one or more pieces 23 of non electro-optic material. The grating modulation sections 14 are constructed in a piece 28 of electro-optic material.

Figure 7A:
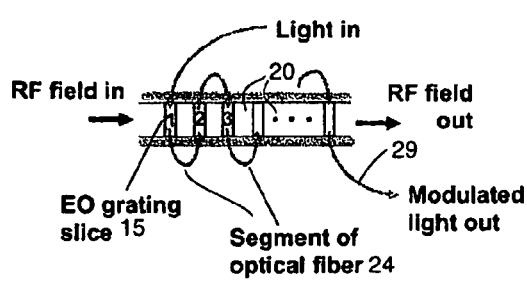
FIG. 7a is an illustration of another embodiment showing the optical modulator comprising multiple slices within an RF waveguide.

FIG. 7a shows another embodiment of a multiple-grating optical modulator. In this embodiment, a single grating (or grating section 14) is located in each slice 15 of electro-optic material within the RF waveguide 20. The path of the light includes a cascade of grating waveguides 14 that are interconnected by segments of non-grating waveguide (which in this case might be segments of optical fiber 24). Although this embodiment shows the light propagating through a single grating waveguide section in a given slice, other embodiments could have that light propagating through multiple grating waveguide sections in a given slice as shown in FIGS. 4b and 5b. When there are multiple grating waveguide sections in a slice 15, those sections and the segment of non-grating waveguide 24 interconnecting them preferably are similar to the ones in the embodiments of FIGS. 4a through 6d.

Figure 7B:
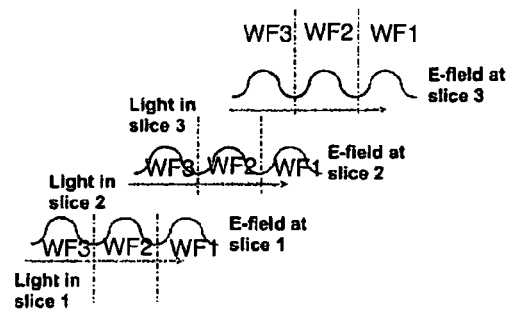

The lengths of the optical waveguide (or optical fiber 24) segments interconnecting the grating sections 14 of successive slices 15 are selected according to the constraint to be described. The RF electromagnetic field propagates through the RF waveguide in a direction that is perpendicular to the in-plane orientation of the slices 15. Thus, different slices will experience the RF electric field at different instances in time. In this embodiment, the length of the optical waveguide (or fiber) segment 24 interconnecting two adjacent slices 15 is chosen to achieve time synchronization of the RF and optical waveforms. This can be achieved if the light travels more quickly in its optical waveguides 14, 24 than the RF electromagnetic field travels in its waveguide 20. This can be achieved by appropriate selection of the materials of the waveguides. Assume a particular temporal portion of the light reaches a slice 15 at the same time a particular associated temporal portion of the RF waveform reaches that slice 15. The length of the optical waveguide (or fiber) segment 24 connecting to the next slice is chosen such that the same temporal portion of the light reaches the next slice at the same time the same associated temporal portion of the time-varying RF waveform reaches that next slice 15. Since the light is traveling more quickly than is the RF electromagnetic field, it in effect catches up with the RF electromagnetic field even though the path taken by the light is longer than the path taken by the RF electromagnetic field. This time-coincidence of the optical field and the RF electromagnetic field is illustrated in FIG. 7b where the light in each successive slice interacts with a common RF wave front (WF1 for example) at a common point in time taken with reference to a wavefront of the light. The same RF electric field interacts with the light in multiple locations wherein the light is in phase.

Figure 8:
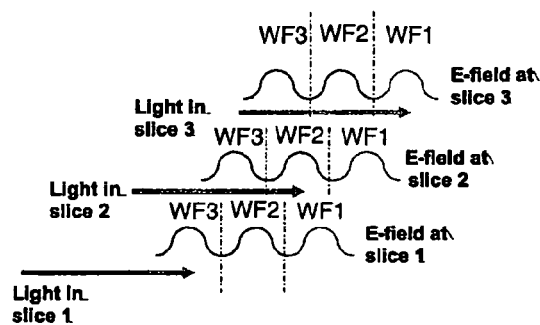
FIG. 8 is an illustration of another form of time-delay matching for gratings in different slices.

It also is possible to have the lengths of the non-grating optical waveguide and/or optical fiber segments 24, 26 chosen according the method illustrated in FIG. 8. In this case, the light reaches a succeeding slice 15 when a later period (or an earlier period) of the RF waveform reaches that slice (compared to reaching the slice when the same period reaches that succeeding slice). The important constraint is that the time delay for the light to propagate through a slice and through the length of interconnecting waveguide or optical fiber is equal to an integer multiple of the period of the RF waveform. This constraint allows the modulation of the light that is imposed by the RF electric field at each slice to be coherent with each other. Thus, the overall modulation for the cascade of gratings is enhanced.

The cascade may include both multiple grating sections 14 that are in a common slice 15 as well as grating sections 14 that are in different slices 15. This is illustrated in FIGS. 5b and 5c (both side views), which shows a TEM RF waveguide 20 having multiple slices 15 of grating modulators (or sensors) 14 with each slice 15 containing multiple grating sections 14 connected by optical waveguide segments 26. Those multiple slices 15 can be connected by segments of optical fiber 24 according to the technique discussed with reference to FIG. 7a. Thus, the input light would be supplied by an optical fiber to a first slice. That light would propagate in a zig-zag path through the multiple grating sections 14 of that first slice 15 (assuming it has multiple grating sections 14 as shown in FIG. 5b, for example). That light (already modulated by those grating sections 14 of the first slice 15) would then be optically coupled through a segment of optical fiber 24 to a second slice 15. That light would then propagate in a zig-zag path through the multiple grating sections 14 in that second slice 15 and be further modulated by those grating sections. That light could then be coupled through yet another segment of optical fiber 24 to a third slice 15, and so on. Alternatively, that light could be coupled by an optical fiber 29 to a photodetector 30.

This application describes an electro-optic (EO) modulator 15 that has multiple waveguide grating sections 14. It is preferable for each waveguide grating section 14 to experience a spatially uniform electric-field, which determines the refractive index of the EO material 10 in that section. The uniform electric-field yields a grating transmittance (or reflectance) spectrum with nulls or peaks that have more abrupt edges—resulting in more efficient modulation. The electric field, although spatially uniform, can vary with time. Thus, one must consider the time it takes for light to propagate through a waveguide grating section 14 compared to the time associated with one-half period of the time-varying electric-field. Also, for a cascade grating modulator having a plurality of slices 15 (as illustrated in FIGS. 5a, 5b and 12), one must consider the time it takes for light to propagate from one waveguide grating section 14 in a first slice 15 to the next waveguide grating section 14 in a second slice 15 of the cascade and compare that time delay with either one or more periods of the time-varying electric-field component of the RF electromagnetic field or with the time delay involved in having the RF electromagnetic-field propagate in the portion of the RF waveguide 20 between those two slices 15 containing waveguide grating sections 14.

The TEM RF waveguide 20, which we preferably use for carrying the propagating EM field (whose time-varying electric-field component represents the modulation controlling input signal), has the benefit that the electric-field is uniform over a large portion of the cross-section of that RF waveguide 20. A waveguide grating section 14 is located in a slice 15 of EO material formed in the TEM RF waveguide 20. FIG. 6a shows a cascade with the multiple waveguide grating sections 14-1 through 14-4 formed in the same cross-sectional slice 15 of the TEM RF waveguide 20. All of these waveguide grating sections experience the same electric-field (E-field) waveform at the same time. In contrast, FIGS. 5c and 7a show a cascade with multiple waveguide grating sections formed in different cross-sectional slices 15 of the TEM RF waveguide (with the understanding that each slice could have either a single waveguide section 14 or multiple waveguide sections at shown in FIGS. 5b, 6a, 6c and/or 6d). Each of these multiple sections (in different slices 15) experiences the electric-field waveform at a different instance in time. FIGS. 5a and 5b illustrate a more general case wherein some of the multiple waveguide grating sections are located in the same cross-sectional slice 15 and there are multiple cross-sectional slices 15, each of which can contain one or more waveguide grating sections 14.

Figure 12:
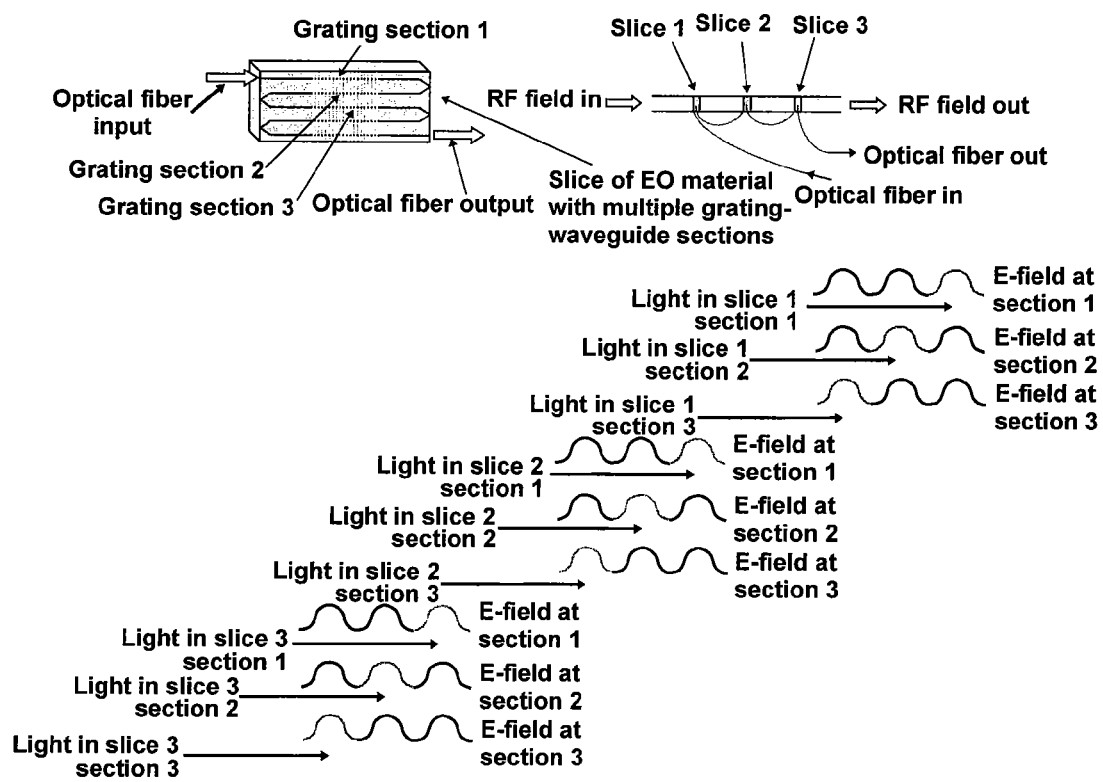
FIG. 12 illustrates the time synchronization between the light propagating through various waveguide grating sections 14 and the RF E-field waveform experienced by those waveguide grating sections 14 due to their location within the RF waveguide.

FIG. 12 illustrates the time synchronization between the light propagating through the various waveguide grating sections 14 and the RF electric-field waveform experienced by those waveguide grating sections 14 due to their location within the RF waveguide 20. For grating sections 14 located in the same slice 15, it is desirable for the light to reach successive sections 14 in synchrony with successive periods of the E-field waveform. If the E-field waveform has a narrow bandwidth (characterized by a time variation of a single frequency or a narrow range of frequencies), the light can pass through many waveguide grating sections 14 before there is appreciable "walk off" between when that light arrives at a section 14 in a slice 15 and the phase of the E-field waveform modulating the refractive index at the time that light arrives.

When considering the light that travels from one given slice 15 to the next slice 15, we note that the RF electromagnetic (EM) field also travels from that one given slice to the next slice. What is important is to select the length of the optical fiber 24 or waveguide 26 interconnecting those two slices such that the light arrives at the next slice at the same time as when the propagating RF electromagnetic field arrives at the next slice. In fact, the light can be made to arrive at the first grating section 14-1 of the next slice at the same time corresponding to the first period of the E-field waveform arriving at that slice. This timing is illustrated in FIG. 12.

Having multiple waveguide grating sections 14 in the same slice 15 limits the bandwidth of the RF signal that can be used efficiently for modulating the light. This limitation arises because different RF signal frequency components have slightly different time periods in their respective waveforms. If the propagation delay of the light between successive sections 14 of one slice 15 is timed to match one signal-frequency component, that propagation time will not be exactly matched to a different signal-frequency component. In contrast, having multiple waveguide grating sections 14 located in different slices 15 need not limit the useful bandwidth of the RF signal. Thus, the embodiment of FIG. 7a (assuming each slice 15 thereof only has a single waveguide grating sections 14 therein) provides a means to achieve even greater modulation efficiency compared to the embodiment of FIGS. 6a, 6c and 6d, but with the same bandwidth constraints as the embodiment of FIGS. 6a, 6c and 6d.

One can think of the light propagating through a waveguide grating section 14 as having an effective group velocity. It takes a certain amount of time for that light to propagate from an input end of the grating to an output end. Similarly, there is an effective group delay associated with the light propagating through a non-grating section 26. It is well known that the group delay can be determined from the slope of the phase term of the grating transmission spectrum. Light propagating through a length of lithium niobate waveguide has a propagation delay of $L/(c/n)$; where c is the speed of light, n is the effective mode index of the waveguided light (approximately 2) and L is the length of the waveguide. For example, the propagation delay for a 1.5 cm length is approximately 0.1 nsec. Light incurs a much larger group delay when it travels through a grating. Assume, for example, that the effective group velocity for light of a particular wavelength that is propagating through a waveguide grating section 14 is one half of the velocity for light propagating through a non-grating waveguide 26. In this case, it would take 0.05 nsec for light to travel through a 0.375 cm length of grating waveguide. If the frequency of the modulation-controlling E-field is 10 GHz, that propagation delay would correspond exactly to one-half period of the 10 GHz waveform. Thus each waveguide grating section 14 could be at most 0.375 cm long. If the waveguide grating section 14 were any longer the modulation efficiency would become severely degraded. For this same example, a segment of non-grating waveguide that interconnects two waveguide grating sections could have a length of 0.75 cm. Thus, the propagation delay through a waveguide grating section is 0.05 nsec and the propagation delay through the next non-grating waveguide segment would be another 0.05 nsec. The light would reach the next waveguide grating section after 0.1 nsec—exactly timed with the period of the 10 GHz waveform.

To describe the timing involved in a cascade of waveguide grating sections 14 that are located in different slices 15, we consider a TEM RF waveguide 20 that is filled with lithium niobate. The RF electromagnetic field propagating in this RF waveguide has a "microwave" index of approximately the square root of 30 (approximately equal to 5.5). However, the light experiences an "optical" index of approximately 2. Thus, the light travels with a much faster velocity than the velocity of the RF electromagnetic field traveling in the RF waveguide 20 in the direction of propagation of the RF electric field. Assume that successive slices 15 containing waveguide grating sections 14 are separated by 0.55 cm in RF waveguide 20. The RF electromagnetic field takes 0.1 nsec to propagate from one slice 15 to the next slice 15. We again assume that the propagation delay through a waveguide grating section 14 is 0.05 nsec. This leaves another 0.05 nsec available for light to travel from one slice 15 to the next slice 15. If the two slices 15 are interconnected by a non-grating waveguide segment in lithium niobate, that optical waveguide segment can have a length of 0.75 cm. The optical waveguide segment generally needs to be longer than the distance between slices since that waveguide segment must include a curve or an abrupt bend or reflection. If the two slices are interconnected by an optical waveguide formed in a material such as silica (or by a piece of optical fiber 24 as depicted in FIG. 5*a*), the refractive index of the light in the silica material is even lower (only approximately 1.5). Thus, that optical waveguide segment can have a length of 1.0 cm. A more practical design would also consider the minimum allowable radius of curvature for a bend in the optical waveguide. This constraint may mean the optical-waveguide interconnecting segment must be even longer. Thus, successive slices 15 may need to be located even farther apart. Note that the larger spacing between successive slices 15 does not affect the allowable bandwidth of the RF signal.

Incidentally, adjacent waveguide grating sections 14 in the same slice 15 can be physically located very close to each other. The main constraint is that there is preferably no side-to-side coupling of the light between these adjacent segments 14. In general, a spacing of 20-40 micrometers is sufficient to prevent this kind of evanescent-field coupling.

The foregoing discussion refers mostly, for simplicity of explanation, to a single-frequency RF waveform. In general the RF electric field contains a band of frequency components. In such cases, one often can define a central frequency component (e.g., the RF carrier) that is dominant. The time synchronization discussed above would be preferably applied to that central frequency component of the RF electric field.

In some cases, it is preferable to fabricate the non-grating optical waveguide segments 26 from a non-EO material. Each waveguide segment 26 and the pair of grating sections 14 adjacent to that waveguide segment 26 form a Fabry-Perot-like optical cavity. The transmittance resonance of this optical cavity preferably overlaps the wavelength range of the grating transmittance feature. When the non-grating optical waveguide 26 comprises a non-EO material, there will not be any modulation of the transmittance of the optical cavity when that non-grating optical waveguide 26 is exposed to the time-varying RF waveform.

In other cases, modulation of the transmittance resonance of the Fabry-Perot-like optical cavity comprising a pair of waveguide grating sections 14 and a waveguide segment 26 between those waveguide grating sections 14 may be suppressed by using an RF waveguide that preferably comprises a micro-strip transmission line (see FIG. 6*c*). The narrow metal-electrode plate or film 22' of the micro-strip transmission line preferably extends over only the waveguide grating sections 14 but preferably does not extend over the optical waveguide segments without gratings 26. Thus, the modulating RF electric field is applied primarily only to the grating sections in microstrip embodiments. In these embodiments, both the grating sections and the waveguide segments can be fabricated from EO material.

Figure 9A:
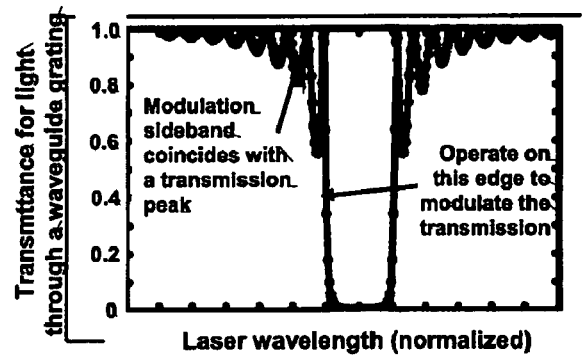
FIGS. 9a & b illustrate the selection of laser wavelength and modulator-grating design for a photonic link.

The selection of the optical wavelength and some specific constraints on the design of a waveguide grating section 14 are discussed next. The wavelength of the light supplied (or input) to the first waveguide grating section 14 preferably coincides with one of the two edges of the grating transmittance spectrum, as illustrated in FIG. 9*a*. A wavelength on the shorter wavelength edge of the spectrum is illustrated in the figure. However, a wavelength on the longer wavelength edge of the spectrum also could be used.

Figure 9B:
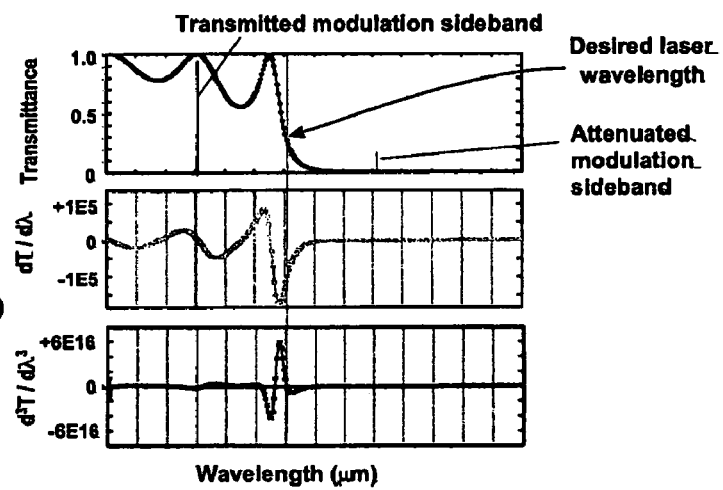

When the light is modulated at a grating by a sinusoidal (single-frequency) RF waveform, additional modulation sidebands are produced in the optical spectrum of the light. The wavelength or frequency of those sidebands is spaced from the wavelength of the input light by an amount equal to the wavelength or frequency of the RF waveform. In general, for intensity modulation of the light, two modulation sidebands are produced—one sideband being at a longer wavelength and one sideband being at a shorter wavelength. The grating is preferably designed such that a first modulation sideband lies within the "stopband" of the grating spectrum (where the reflectance is high). This sideband is attenuated. A second modulation sideband has a wavelength or frequency that preferably coincides with a region of the spectrum for which the transmittance is at a maximum (as illustrated in FIG. 9*b*). This other sideband experiences little modulation by subsequent grating sections. Thus, as the light propagates through successive grating sections, more and more of that optical energy is moved from the input wavelength into the second modulation sideband. The result is that the modulation depth is increased, as desired. In general, the RF waveform does not comprise a single wavelength or frequency by rather comprises a band of wavelengths or frequencies. Preferably, the spectral width over which the transmittance is near a maximum is large compared with the bandwidth of the RF waveform. For a wavelength span equivalent to the bandwidth of the RF waveform, the change in the grating transmittance around the local maximum at which the second modulation sideband is located preferably is smaller than some specification (such as being 10% or 1% of the value for the transmittance maximum). In this way, there is less distortion of the modulated light. Preferably, the first derivative and the third derivative of the grating transmittance spectrum (which are also shown in FIG. 9*b*) have values close to zero at the wavelengths corresponding to the modulation sidebands.

When the light passes through a cascade of multiple waveguide grating sections 14, the effective transmittance spectrum of that cascade is different from the transmittance spectrum of a single grating section. The change in this net transmittance spectrum as the number of cascaded sections is increased is illustrated in FIGS. 10 and 11.

Figure 10:
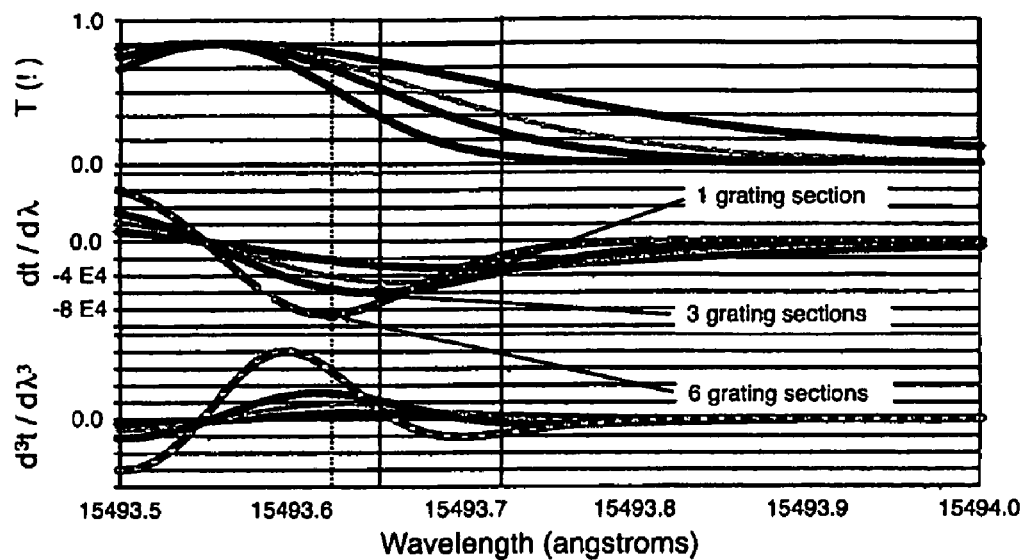
FIG. 10 illustrates the selection of laser wavelength input to a multiple-grating modulator.
Figure 11:
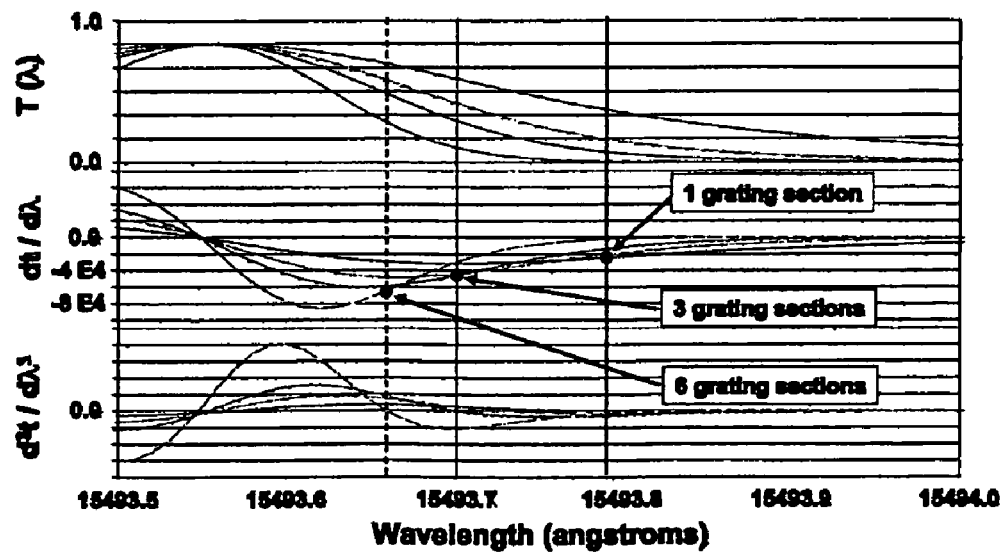
FIG. 11 illustrates the selection of laser wavelength input to a multiple-grating modulator.

FIG. 11 illustrates a case wherein the laser wavelength is selected to minimize the $3^{rd}$-order intermodulation distortion of the modulator. An alternative operating point could, instead, maximize the modulation depth (by selecting the laser wavelength to maximize the first derivative of the grating transmittance spectrum). This alternative operating point is illustrated in FIG. 10. This type of operating point might be preferred when the modulator is used not for analog inputs but rather to perform phase-shift keying or some other digital modulation format. The first derivative of the grating transmittance spectrum provides an indication of the depth of modulation that can be achieved for a given intensity of the RF electric field. Note that the sidewall of the spectrum shown in FIGS. 10 and 11 becomes steeper (the first derivative is increased) as the number of waveguide grating sections 14 is increased. The maximum value of the third derivative of the spectrum also is increased. However, that third derivative goes through a null (a point of zero value) for some value of the optical wavelength. When the bandwidth of the RF waveform is smaller than one octave, the primary contribution to distortion is the 3rd order intermodulation product for cases wherein the RF signal comprises more than one frequency. In these cases, what is important is the third derivative of the grating transmittance spectrum rather than both the second derivative and the third derivative. The primary contribution to distortion for sub-octive bandwidth signals is the 3rd order intermodulation products since those frequencies of the intermodulation products lie very close to the frequencies of the signal. To minimize this distortion, the wavelength of the input light can be chosen to coincide with the specific portion of the slope of the grating transmittance spectrum at which the third derivative is equal to zero. This choice of optical wavelength is illustrated in FIG. 11 and is described in greater detail in the related U.S. patent application Ser. No. 12/141,834 identified above. One should be careful to note that the specific wavelength at which this null occurs changes as the number of cascaded sections changes.

FIG. 10 also shows that the depth of modulation (the slope of the grating transmittance spectrum at the desired operating point—the chosen frequency of the input light) increases by roughly a factor of 2 when the number of waveguide grating sections 14 is increased by a factor of 3. Thus, the depth of modulation increases by roughly a factor of four for that same increase in the number of waveguide grating sections 14. Thus, the improvement in modulation depth ideally scales with the number of waveguide grating sections in greater than an 1-to-1 ratio. There is, however, a practical limit to the number of sections that is desirable. This practical limit occurs because some of the light can be attenuated by optical losses that occur at each reflecting turn-around of a waveguide segment or at each coupling junction between a waveguide grating section 14 and an optical fiber. The effect of these additional losses becomes more significant as the number of sections is increased.

Having described this invention in connection with several embodiments and applications of same, further embodiments and/or applications will doubtlessly suggest themselves to those skilled in the art. As such the invention is not to be limited to the disclosed embodiments or to the disclosed applications for using same unless specifically required by the appended claims.

The invention claimed is:

1. An optoelectronic-RF device comprising:
at least one optical modulator/sensor, said at least one optical modulator/sensor comprising at least two cascaded optical-waveguide gratings and at least one non-grating optical waveguide segment interconnecting said at least two cascaded optical-waveguide gratings, with at least one optical waveguide segment interconnecting the at least two cascaded optical-waveguide gratings via said at least one non-grating optical waveguide segment; and
an RF waveguide for propagating an RF electric field, the at least one optical modulator/sensor being disposed in and forming a portion of the RF waveguide with light propagating through the cascaded optical-waveguide gratings in a direction that is perpendicular to a direction of propagation of the RF electric field in the RF waveguide.

2. The optoelectronic-RF device according to claim 1 wherein the cascaded optical-waveguide gratings of said at least one optical modulator/sensor are located in a common slice of electro-optic material that is disposed in the RF waveguide.

3. The optoelectronic-RF device according to claim 2 wherein the at least one non-grating optical waveguide segment is located in non-electro-optic material having a lower refractive index than the electro-optic material of the cascaded optical-waveguide gratings.

4. The optoelectronic-RF device according to claim 2 wherein the RF waveguide applies a relatively strong RF electric field in the vicinity of the optical waveguide gratings and applies a relatively weak RF electric field in the vicinity of the at least one non-grating optical waveguide segment.

5. The optoelectronic-RF device according to claim 1 wherein said optoelectronic-RF device comprises a plurality of the optical modulator/sensors and wherein at least two of the optical waveguide gratings of the plurality of the optical modulator/sensors are located in two different slices of electro-optic material in the RF waveguide, the plurality of the optical modulator/sensors being interconnected by one or more separate optical waveguides.

6. The optoelectronic-RF device according to claim 5 wherein the plurality of the optical modulator/sensors are spaced apart within the RF waveguide and lengths of the one or more separate optical waveguides are selected to achieve time synchronization of (i) RF waveforms traveling in said RF waveguide and (ii) optical waveforms traveling in said one or more separate optical waveguides.

7. The optoelectronic-RF device according to claim 5 wherein the velocity of the light traveling in the at least one non-grating optical waveguide segment is faster than the velocity of a RF electromagnetic field traveling in the RF waveguide in the direction of propagation of the RF electric field.

8. The optoelectronic-RF device according to claim 2 wherein said common slice has at least one endface having an optically reflective structure thereon.

9. The optoelectronic-RF device according to claim 1 wherein the RF waveguide includes two metallic films or plates located on opposing faces of said RF waveguide, the two metallic films or plates extend along a length of the RF waveguide and define an electric field pattern in the vicinity of at least two cascaded optical waveguide gratings.

10. The optoelectronic-RF device according to claim 9 wherein the electric field pattern is substantially uniform.

11. A method for modulating input light wherein the light is propagated through a cascade of at least two optical gratings formed in electro-optic material and modulated by an applied RF electromagnetic field which is applied to that electro-optic material, wherein the applied RF electromagnetic field has a propagation direction and has an RF electric-field component with a time-varying waveform and a dominant frequency;
selecting the length of each waveguide optical grating such that light propagates entirely through each grating in a time shorter than one-half of the period of the dominant frequency of the time-varying RF waveform;
connecting two successive waveguide optical gratings with a segment of optical waveguide having a length selected such that time delay of light from propagating through a waveguide grating and a segment of optical waveguide is equal to an integer multiple of the period of the dominant frequency of the time-varying RF waveform; and
arranging each waveguide optical grating in said applied RF electric field such that light propagates in each waveguide optical grating in a direction orthogonal to a direction of the applied RF electric field and orthogonal to the propagation direction of the RF electromagnetic field.

12. The method of claim 11 wherein a segment of optical waveguide or optical fiber connects two successive optical waveguide gratings that are located in two different slices of an RF waveguide for said applied RF electromagnetic field, the method further including selecting a length of the segment of the optical waveguide or optical fiber such that a time delay of light propagating through an adjacent grating and through said segment of optical waveguide or optical fiber is equal to a time delay of the RF electromagnetic field propagating between said two consecutive slices of the RF waveguide.

13. The method of claim 11 wherein a segment of optical waveguide or optical fiber connects two successive optical waveguide gratings that are located in two consecutive slices of an RF waveguide for said applied RF electromagnetic field, the method further including selecting a length of the segment of the optical waveguide or optical fiber chosen such that the time delay of the light propagating through a optical waveguide grating and through said segment of optical waveguide or optical fiber is equal to the time delay of the RF electromagnetic field propagating between those two slices of the RF waveguide plus a multiple of the period of the time-varying RF waveform.

14. The method of claim 11 wherein the applied RF electromagnetic field propagates in an RF waveguide, wherein the cascade of at least two optical gratings occurs in at least two different, spaced-apart slices occurring in said RF waveguide, and wherein the light propagating through said cascade propagates in a direction orthogonal to a direction of propagation of said RF electromagnetic field.

15. The method of claim 11 wherein light supplied to the cascade of optical gratings has a selected wavelength, wherein the cascade of at least two optical gratings has a transmittance spectrum with a primary notch therein and wherein the selected wavelength is selected such that it lies on an edge of primary notch of said transmittance spectrum.

16. The method of claim 15 wherein the transmittance spectrum has at least one transmittance peak adjacent said primary notch, the cascade of at least two optical gratings modulating the light supplied to the cascade and producing light having at least one modulation sideband, and wherein the at least one transmittance peak is sufficiently wide such that wavelengths of the at least one modulation sideband lie upon it.

17. The method of claim 16 wherein the transmittance spectrum has a first derivative of transmittance with respect to wavelength having a value of approximately zero at the frequencies of the modulation sideband.

18. The method of claim 15 wherein the transmittance spectrum has a first derivative of transmittance with respect to wavelength and wherein the wavelength of light is selected to coincide with a point where said first derivative is maximized.

19. The method of claim 15 wherein the transmittance spectrum has a first derivative of transmittance with respect to wavelength and a third derivative of transmittance with respect to wavelength and wherein the wavelength of light is selected to coincide with a point where said first derivative is non-zero and said third derivative is approximately zero.

* * * * *